(12) United States Patent
Zhao et al.

(10) Patent No.: US 10,994,410 B2
(45) Date of Patent: May 4, 2021

(54) THREE-DEGREE-OF-FREEDOM PARALLEL MECHANISM WITH CURVED SLIDING PAIRS

(71) Applicant: SHENZHEN INSTITUTES OF ADVANCED TECHNOLOGY CHINESE ACADEMY OF SCIENCES, Shenzhen (CN)

(72) Inventors: Guoru Zhao, Shenzhen (CN); Yongfeng Wang, Shenzhen (CN)

(73) Assignee: SHENZHEN INSTITUTES OF ADVANCED TECHNOLOGY CHINESE ACADEMY OF SCIENCES, Shenzhen (CN)

( * ) Notice: Subject to any disclaimer, the term of this patent is extended or adjusted under 35 U.S.C. 154(b) by 0 days.

(21) Appl. No.: 16/479,920

(22) PCT Filed: Apr. 25, 2017

(86) PCT No.: PCT/CN2017/081823
§ 371 (c)(1),
(2) Date: Jul. 22, 2019

(87) PCT Pub. No.: WO2018/195762
PCT Pub. Date: Nov. 1, 2018

(65) Prior Publication Data
US 2019/0389050 A1 Dec. 26, 2019

(51) Int. Cl.
*B25J 9/00* (2006.01)
*B25J 17/02* (2006.01)

(52) U.S. Cl.
CPC ............ *B25J 9/003* (2013.01); *B25J 17/0216* (2013.01); *B25J 17/0283* (2013.01)

(58) Field of Classification Search
CPC ...... B25J 9/0051; B25J 9/003; B25J 17/0216; B25J 18/005
See application file for complete search history.

(56) References Cited

FOREIGN PATENT DOCUMENTS

| CN | 2762940 Y | * | 3/2006 |
| CN | 101244560 A | | 8/2008 |

(Continued)

OTHER PUBLICATIONS

International Search Report issued corresponding International application No. PCT/CN2017/081823, dated Jul. 2017.

*Primary Examiner* — Bobby Rushing, Jr.

(57) ABSTRACT

A three-degree-of-freedom parallel mechanism with curved sliding pairs includes a fixed platform, a moving platform, and three curved branches disposed between the fixed platform and the moving platform. Each of the curved branches includes a first curved link and a second curved link that share a common arc center. One end of the first curved link is connected to fixed platform by a rotational pair. One end of the second curved link is disposed in a cavity at another end of the first curved link. The second curved link is operative to perform a reciprocating motion along a tangent of an arc of the first curved link. Another end of the second curved link is connected to the moving platform by a ball joint. The axes of the three rotational pairs of the three curved branches coincide with each other and are perpendicular to the fixed platform. In the three-degree-of-freedom parallel mechanism with curved sliding pairs, the moving platform of the parallel mechanism is rotatable around the X-axis, Y-axis, and Z-axis of a three-dimensional coordinate system taking the arc center of the three curved branches as the origin, where the rotation of the moving platform about the Z axis is decoupled from the rotation in the other two orientations.

4 Claims, 2 Drawing Sheets

(56) References Cited

FOREIGN PATENT DOCUMENTS

| CN | 102528817 | A |   | 7/2012  |
|----|-----------|---|---|---------|
| CN | 103639712 | A | * | 3/2014  |
| CN | 104827463 | A |   | 8/2015  |
| CN | 206066431 | U |   | 4/2017  |
| CN | 110405727 | A | * | 11/2019 |
| TW | 201121735 | A |   | 7/2011  |

* cited by examiner

THREE-DEGREE-OF-FREEDOM PARALLEL MECHANISM WITH CURVED SLIDING PAIRS

CROSS REFERENCE TO RELATED APPLICATIONS

This application is the U.S. National Stage of International Patent Application No. PCT/CN2017/081823, filed on Apr. 25, 2017, the entire disclosure of which is hereby incorporated herein by reference.

TECHNICAL FIELD

The present disclosure relates to the technical field of parallel mechanisms, and more particularly relates to a three-degree-of-freedom parallel mechanism with curved sliding pairs.

BACKGROUND

Since the parallel robot was first proposed in 1938, it has been widely used in various fields of the society because of its large rigidity, strong bearing capacity, small error, high precision, small self-weight to load ratio, good dynamic performance, and ease of control. Nowadays, commonly seen are 2 degrees of freedom (DOF), 3 degrees of freedom, 4 degrees of freedom, and 6 degrees of freedom parallel mechanisms. At present, the 3-DOF parallel mechanisms are the most researched and widely used type of parallel mechanism with relatively fewer degrees of freedom. They can be divided into four categories depending on the type of platform DOF, including 3-rotational parallel mechanisms, 2-rotational and 1-translational parallel mechanisms, 1-rotational and 2-translational parallel mechanisms, and 3-translational parallel mechanisms. Among them, the spherical parallel mechanism belongs to a 3-rotational parallel mechanism, which can achieve arbitrary rotation about a spherical center of a moving spherical surface of a reference point of the moving platform. When the mechanism moves, all the points on the moving platform of the mechanism rotate around the spherical center at a fixed radius. Advantages of a spherical parallel mechanism over a general parallel mechanism are a large workspace, flexibility and reliability, and non-vulnerability to interference.

One example is a biased-output three-degree-of-freedom spherical parallel mechanism (CN101306534) with a central spherical hinge proposed by Professor Feng GAO et al. of Yanshan University, which features a typical 3-RRR type mechanism. It can achieve the rotation in three orientations around the fixed center.

Professor Zhen HUANG of Yanshan University proposed a parallel mechanism (CN102962840) with a symmetrical structure and no accompanying motion. The moving platform can rotate continuously around any axis or any point in the middle symmetry plane between the moving platform and the fixed platform, which can effectively avoid the occurrence of accompanying motion.

Long SHEN of Shanghai University proposed a spherical three-degree-of-freedom parallel mechanism antenna structure system (CN101924266). Compared with the general 3-DOF spherical mechanisms, it has a relatively larger workspace.

Rongfu LIN et al. of Shanghai Jiaotong University proposed a three-degree-of-freedom spherical parallel mechanism with curved sliding pairs (CN104827463), which accomplishes the rotation of the moving platform around the midpoint of the arc in three orientations by means of curved sliding pairs.

Most of the kinematic pairs of the branches of these mechanisms include RR or RRR configurations, and the axes of these kinematic pairs intersect at one point to realize the movement of three degrees of freedom of the moving platform. Among them, Rongfu LIN of Shanghai Jiaotong University adopts curved sliding pairs so that by the curved configuration of the kinematic pairs the moving platform is subjected to forces in three orientations. However, the moving platform can only rotate around the center of the arc in three orientations, lacking the feature of partial decoupling.

SUMMARY

In view of the above, there is a need to provide a three-degree-of-freedom parallel mechanism with curved sliding pairs having partial decoupling.

There is provided a three-degree-of-freedom parallel mechanism with curved sliding pairs, which includes a fixed platform, a moving platform, and three curved branches disposed between the fixed platform and the moving platform.

Each of the curved branches includes a first curved link and a second curved link which share a common arc center. The first curved link has one end connected to the fixed platform by a rotational pair. The second curved link has one end disposed in a cavity at another end of the first curved link, and is operative to perform a reciprocating motion along a tangent of an arc of the first curved link. The second curved link has another end connected to the moving platform by a ball joint. Axes of the three rotational pairs of the three curved blanches coincide with each other and are perpendicular to the fixed platform. The three curved branches share a common arc center, where the arc center is located on the axis of the three rotational pairs.

In one embodiment, the cavity of the first curved link has a circular, elliptical or square cross section.

In one embodiment, the three curved branches have different radii.

In one embodiment, the radii of the three curved branches are gradually reduced in a direction away from the fixed platform.

In the above-mentioned three-degree-of-freedom parallel mechanism with curved sliding pairs, one end of each of the curved branches is connected to the fixed platform by a rotational pair, while the other end of each of the curved branches is connected to the moving platform by a ball joint. The axes of the three rotational pairs of the three curved branches coincide with each other and are perpendicular to the fixed platform. As such, the moving platform of the parallel mechanism is operative to rotate around the X-axis, Y-axis, and Z-axis of the three-dimensional coordinate system taking the arc center of the three curved branches as the origin of the three-dimensional coordinate system, where the rotation of the moving platform about the Z axis is decoupled from the rotation in the other two orientations.

BRIEF DESCRIPTION OF THE ACCOMPANYING DRAWINGS

DETAILED DESCRIPTION OF ILLUSTRATIVE EMBODIMENTS

To provide a better understanding for the objects, technical solutions and advantages of the present disclosure, the present disclosure will now be described in further detail below. It is to be understood that the specific embodiments described herein are merely illustrative of the present disclosure and are not intended to limit the present disclosure.

Figure 1:
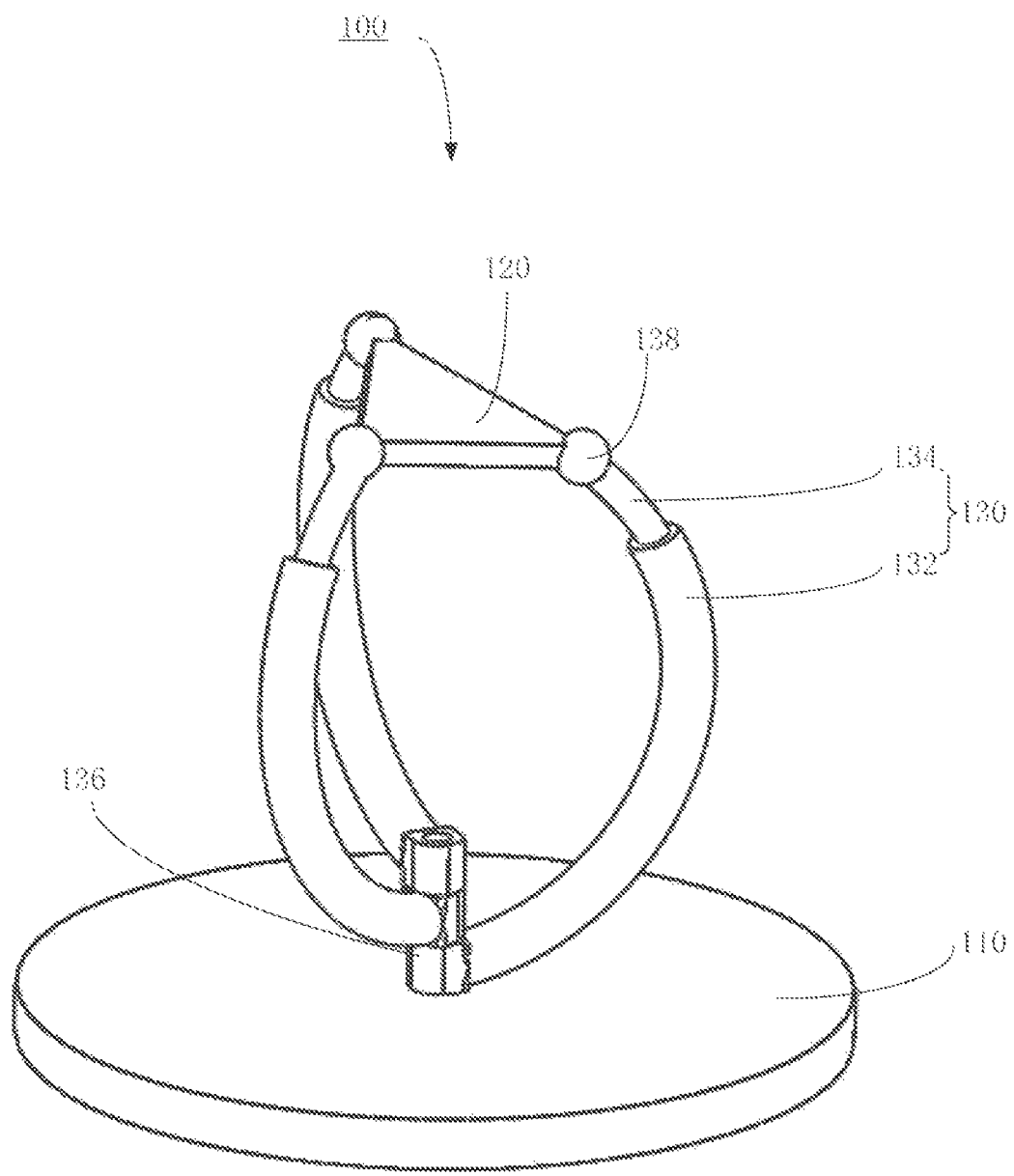
FIG. 1 is schematic diagram illustrating a three-degree-of-freedom parallel mechanism having curved sliding pairs according to an embodiment of the present disclosure.

Referring to FIG. 1, a three-degree-of-freedom parallel mechanism 100 having curved sliding pairs according to an embodiment includes a fixed platform 110, a moving platform 120, and three curved branches 130 disposed between the fixed platform 110 and the moving platform 120.

Figure 2:
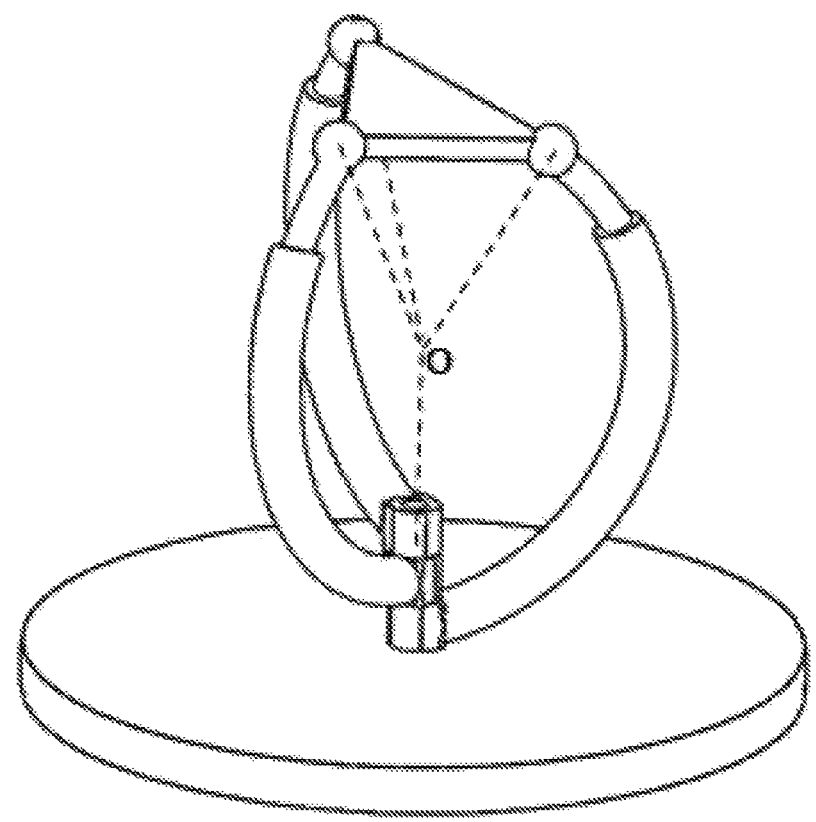
FIG. 2 is schematic diagram illustrating an arc center of three curved branches of a three-degree-of-freedom parallel mechanism having curved sliding pairs.

Referring also to FIG. 2, each of the curved branches 130 includes a first curved link 132 and a second curved link 134 that share a common arc center. One end of the first curved link 132 is connected to the fixed platform 110 by a rotational pair 136. One end of the second curved link 134 is disposed in a cavity at the other end of the first curved link 132, and the second curved link 134 is reciprocable along a tangent of the circular arc of the first curved link 132. The other end of the second curved rod 134 is connected to the moving platform 120 by a ball joint 138.

In the present embodiment, the fixed platform 110 is configured as a circular plate. It is to be appreciated that the structure of the fixed platform 110 can be designed as a square plate, a rectangular plate or the like according to requirements. The structure of the moving platform 120 is a triangular plate. The three vertices of the triangular plate are respectively connected to ends of the three curved branches 130 away from the fixed platform 110 by three ball joints 138, respectively.

The axes of the three rotational pairs 136 of the three curved branches 130 coincide with each other and are perpendicular to the fixed platform 110. The three curved branches 130 share a common arc center and the arc center is located on the axis of the three rotational pairs 136.

The first curved link 132 may be a curved tubular structure. The cross section of the cavity of the first curved link 132 may be a circular, elliptical or square structure. The cross section of the second curved link 134 may be a circular, elliptical or square structure that matches the cavity structure of the first curved link 132.

The second curved link 134 can reciprocate along a tangent of an arc of the first curved link 132; that is, the second curved link 134 can enter or reach out of the first curved link 132, thereby adjusting the distance between the moving platform 120 and the fixed platform 110.

The three curved branches 130 have different radii. Specifically, the radii of the three curved branches 130 are gradually reduced in a direction away from the fixed platform 110.

In the three-degree-of-freedom parallel mechanism 100 with curved sliding pairs, one end of each of the curved branches 130 is connected to the fixed platform 110 by a rotational pair 136, while the other end of each of the curved branches 130 is connected to the moving platform 120 by a ball joint. The axes of the three rotational pairs 136 of the three curved branches 130 coincide with each other and are perpendicular to the fixed platform 110. The three curved branches 130 share a common arc center which is located on the axis of the rotational pair 136. By driving the first curved link 132 to rotate around the axis of the rotational pair 136, the moving platform 120 is operative to rotate around the X-axis, the Y-axis, and the Z-axis of a three-dimensional coordinate system in which the arc center of the three curved branches 130 is the origin of the three-dimensional coordinate system. Referring to FIG. 2, where the above-mentioned center of rotation of the moving platform 110 of the parallel mechanism is the arc center O of the three curved branches 130. The rotation of the moving platform 120 about the Z axis is decoupled from the rotation in the other two orientations, where an extending direction of the Z axis is the extending direction of the axis of the rotating pair 136.

In the above-mentioned three-degree-of-freedom parallel mechanism 100 with curved sliding pairs, the moving platform 120 is operative to rotate around the X-axis, Y-axis, and Z-axis of the three-dimensional coordinate system taking the arc center of the three curved branches as the origin of the three-dimensional coordinate system, where the rotation of the moving platform 120 about the Z axis (the axis of the rotational pairs 136) is decoupled from the rotation in the other two orientations. The three-degree-of-freedom parallel mechanism 100 with the curved sliding pairs described supra has advantages of a simple and reliable structure, a strong driving capability, a high flexibility, and a stable movement of the movable platform 120. It can be applied to various fields such as virtual axis machining tools, industrial robots, aviation simulation equipment, medical equipment, etc.

The foregoing merely depicts some exemplary embodiments according to the present disclosure, and it should be noted that those having ordinary skill in the art would also be able to make numerous improvements and refinements without departing from the principles of the present disclosure. These improvements and refinements should also be regarded as falling in the scope of protection of the present disclosure.

What is claimed is:

1. A three-degree-of-freedom parallel mechanism with curved sliding pairs, comprising a fixed platform, a moving platform, and three curved branches disposed between the fixed platform and the moving platform;
   wherein each of the curved branches comprises a first curved link and a second curved link that share a common arc center, the first curved link comprising one end connected to the fixed platform by a rotational pair, the second curved link comprising one end disposed in a cavity at another end of the first curved link, the second curved link being operative to perform a reciprocating motion along a tangent of an arc of the first curved link, wherein the second curved link comprises another end connected to the moving platform by a ball joint, axes of the three rotational pairs of the three curved branches are coaxial with each other and are perpendicular to the fixed platform, the three curved branches share a common arc center, where the arc center is located on the axes of the three rotational pairs.

2. The three-degree-of-freedom parallel mechanism with curved sliding pairs according to claim 1, wherein the cavity of the first curved link has a circular, elliptical or square cross section.

3. The three-degree-of-freedom parallel mechanism with curved sliding pairs according to claim 1, wherein the three curved branches have different radii.

4. The three-degree-of-freedom parallel mechanism with curved sliding pairs according to claim 3, wherein the radii of the three curved branches are gradually reduced in a direction away from the fixed platform.

\* \* \* \* \*